United States Patent
Cheng

(10) Patent No.: US 9,722,302 B2
(45) Date of Patent: Aug. 1, 2017

(54) PLANAR ANTENNA MICROWAVE MODULE

(71) Applicant: HYTRONIK ELECTRONICS CO., LTD, Shenzhen, Guangdong (CN)

(72) Inventor: Yabing Cheng, Shenzhen (CN)

(73) Assignee: HYTRONIK ELECTRONICS CO., LTD, Shenzhen (CN)

( * ) Notice: Subject to any disclaimer, the term of this patent is extended or adjusted under 35 U.S.C. 154(b) by 94 days.

(21) Appl. No.: 14/704,932

(22) Filed: May 5, 2015

(65) Prior Publication Data
US 2015/0236403 A1    Aug. 20, 2015

Related U.S. Application Data

(63) Continuation-in-part of application No. PCT/CN2013/075808, filed on May 17, 2013.

(30) Foreign Application Priority Data

Apr. 19, 2013   (CN) .................... 2013 2 0198998 U

(51) Int. Cl.
*H01Q 1/24*    (2006.01)
*G01S 13/50*   (2006.01)

(52) U.S. Cl.
CPC .......... *H01Q 1/247* (2013.01); *G01S 13/505* (2013.01)

(58) Field of Classification Search
CPC ........................ H01Q 1/247; H05B 37/0227
USPC .......................... 343/700 MS, 702, 829, 846
See application file for complete search history.

(56) References Cited

U.S. PATENT DOCUMENTS

| | | | | |
|---|---|---|---|---|
| 2,769,119 A | * | 10/1956 | Loring ..................... | H01G 4/28 361/763 |
| 5,523,768 A | * | 6/1996 | Hemmie ................ | H01Q 1/247 343/700 MS |
| 5,563,617 A | * | 10/1996 | Redfern .................. | G01S 7/032 343/702 |
| 6,686,883 B2 | * | 2/2004 | Fujiwara .................. | H01Q 1/38 343/700 MS |

(Continued)

FOREIGN PATENT DOCUMENTS

| CN | 201464644 U | 5/2010 |
|---|---|---|
| CN | 202433533 U | 9/2012 |

OTHER PUBLICATIONS

International Search Report of PCT Patent Application No. PCT/CN2013/075808 issued on Jan. 23, 2014.

*Primary Examiner* — Tho G Phan

(57) ABSTRACT

The present invention discloses a planar antenna microwave module, including an oscillation circuit board and a planar antenna board. The oscillation circuit board is a double-sided printed circuit board. The planar antenna board is a double-sided PCB independent of the oscillation circuit board. PCB copper foil of the planar antenna board forms a transmitting/receiving planar antenna. The planar antenna is laminated on a bottom surface of the oscillation circuit board by using a solder joint that runs through and electrically connects two layers of PCB copper foil, and is electrically connected to the oscillation circuit board through the solder joint. The antenna boards in the present invention are of independent and separate structures, and have a small design size, a simple manufacturing process, a short production cycle, low costs, and high economic benefits.

8 Claims, 5 Drawing Sheets

(56) References Cited

U.S. PATENT DOCUMENTS 6,727,853 B2 * 4/2004 Sasada .................. G01S 7/03
 343/700 MS
9,166,638 B2 * 10/2015 Kan ..................... H04B 1/123

* cited by examiner

PLANAR ANTENNA MICROWAVE MODULE

CROSS REFERENCE TO RELATED APPLICATIONS

The present application is a Continuation-in-part Application of PCT application No. PCT/CN2013/075808 filed on May 17, 2013, which claims the benefit of Chinese Patent Application No. 201320198998.1 filed on Apr. 19, 2013. All the above are hereby incorporated by reference.

BACKGROUND

Technical Field

The present invention relates to the field of wireless sensors, and in particular, to a planar antenna microwave module.

Related Art

A basic principle of a 5.8 GHZ planar antenna microwave module is the theory of Doppler effect: electromagnetic wave field strength with a frequency of 5.8 GHZ is generated; the frequency and amplitude of a reflected echo change when a moving target object is detected; and then a valid electrical signal is output after circuit detection processing. A conventional 5.8 GHZ planar antenna microwave module is manufactured by using a process of laminating four layers of high frequency boards and drilling blind vias, and therefore has a relatively large design size, a complicated manufacturing process, a long production cycle, high costs, and a low price/performance ratio, and is not suitable for large-scale applications.

SUMMARY

In order to solve the foregoing problem, an objective of the present invention is to provide a planar antenna microwave module that is used for a simplified structure, a small design size, a simple process, a short production cycle and low costs.

The present invention is implemented by using the following technical means: A planar antenna microwave module includes an oscillation circuit board and a planar antenna board, where the oscillation circuit board is a double-sided printed circuit board (PCB) which an upper surface is laid with a 5.8 GHZ oscillation circuit, a mixer circuit (which may also be referred to as a detector circuit) and a signal output module; the planar antenna board is a double-sided PCB independent of the oscillation circuit board; PCB copper foil of the planar antenna board forms a transmitting/receiving planar antenna; and the planar antenna is laminated on a bottom surface of the oscillation circuit board by using a solder joint that runs through and electrically connects two layers of PCB copper foil, and is electrically connected to the oscillation circuit board through the solder joint.

Preferably, an upper surface of the oscillation circuit board is laid with a microwave oscillator, a microwave Schottky diode double balanced mixer and an intermediate frequency (IF) doppler signal output module, the microwave oscillator includes an input end and an output end, the input end of the microwave oscillator is connected to a power supply, the output end of the microwave oscillator is connected to an input end of the microwave Schottky diode double balanced mixer and the antenna board, the input end of the microwave Schottky diode double balanced mixer is also connected to the planar antenna, and an output end of the microwave Schottky diode double balanced mixer is connected to an input end of the IF doppler signal output module.

Preferably, one side of the oscillation circuit board is provided with an assembly portion, a pin header component is jointed with the assembly portion of the oscillation circuit board, and a metal shielding can covers an upper surface of the oscillation circuit board.

Preferably, the oscillation circuit board has a cuboidal board body, the board body of the oscillation circuit board has a length of 21.5 mm, a width of 19 mm and a thickness of 0.3 mm, a dielectric constant of the board body of the oscillation circuit board is 3.38; or the board body of the oscillation circuit board is an FR-4 board with a thickness of 0.5-0.7 mm and a dielectric constant of 4.3-4.8.

Preferably, the microwave oscillator includes a high frequency transistor, a microstrip inductor and a microstrip capacitor, the inductance of copper foil of the microstrip inductor is 1.6-1.9 nH, and the capacitance of copper foil of the microstrip capacitor is 0.25-0.29 pF.

Preferably, the microwave Schottky diode double balanced mixer has ring impedance, and a value of the ring impedance of the microwave Schottky diode double balanced mixer is 50Ω.

Preferably, the planar antenna board has a cuboidal board body, the board body of the planar antenna board has a length of 19 mm, a width of 13.5 mm and a thickness of 0.8-0.9 mm, and a dielectric constant of the board body of the planar antenna board is 3.38.

Preferably, the planar antenna board is of an independent and separate structure, and the planar antenna board is fixedly disposed on the bottom surface of the oscillation circuit board by means of a surface-mount device (SMD) or metal wire soldering.

Preferably, the transmitting/receiving planar antenna is of a planar rectangular structure, the transmitting/receiving planar antenna is designed as a rectangular antenna by using PCB copper foil, and the PCB copper foil of the rectangular antenna has a length of 18.25 mm and a width of 12.8 mm.

The antenna boards in the present invention are of independent and separate structures, and have a small design size, a simple manufacturing process, a short production cycle, low costs, and high economic benefits.

DETAILED DESCRIPTION

Figure 1:
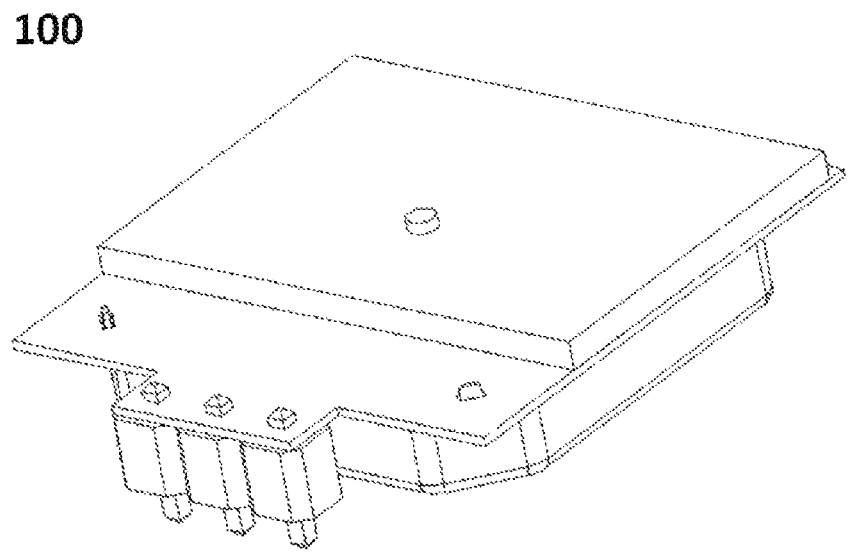
FIG. 1 is a schematic structural diagram according to an embodiment of the present invention.
Figure 2:
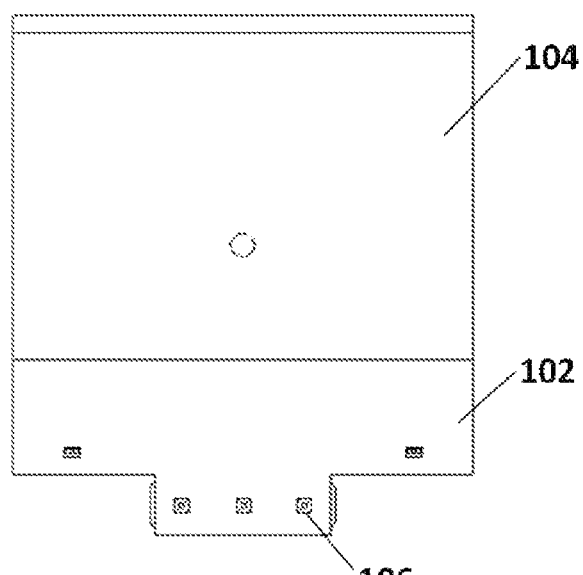
FIG. 2 is a top view of the structure of a product according to an embodiment of the present invention.
Figure 3:
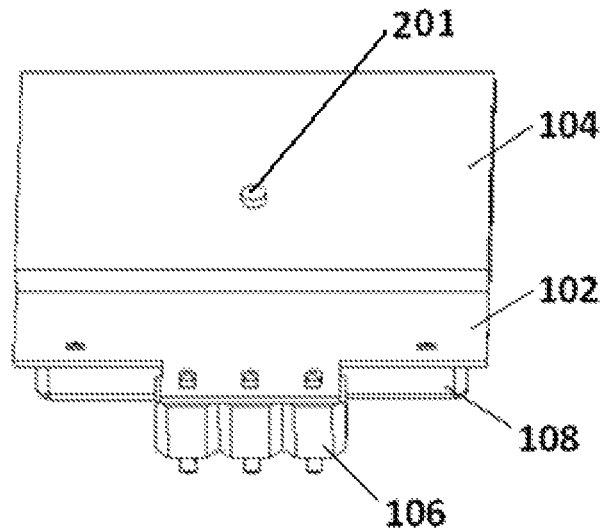
FIG. 3 is a front view of the structure of a product according to an embodiment of the present invention.
Figure 4:
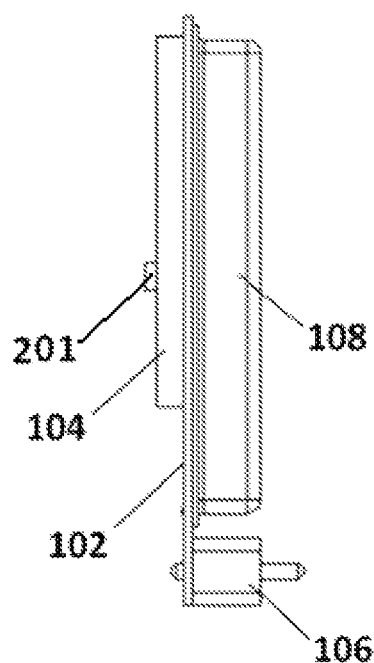
FIG. 4 is a side view of the structure of a product according to an embodiment of the present invention.

The present invention is further described below in detail with reference to the embodiments and accompanying drawings.

As shown in FIG. 1 to FIG. 9, a 5.8 GHz planar antenna type microwave sensor 100 includes: an oscillation circuit board 102, two layers of PCB copper foil (an antenna board) 104, a pin header component 106, and a metal shielding can 108. The oscillation circuit board 102 includes an upper surface and a bottom surface. The antenna board 104 is fixedly disposed on the bottom surface of the oscillation circuit board 102 by using a solder joint 201. One side of the oscillation circuit board 102 is provided with an assembly portion, the pin header component 106 is jointed with the assembly portion of the oscillation circuit board 102, and the metal shielding can 108 covers the upper surface of the oscillation circuit board 102.

Figure 5:
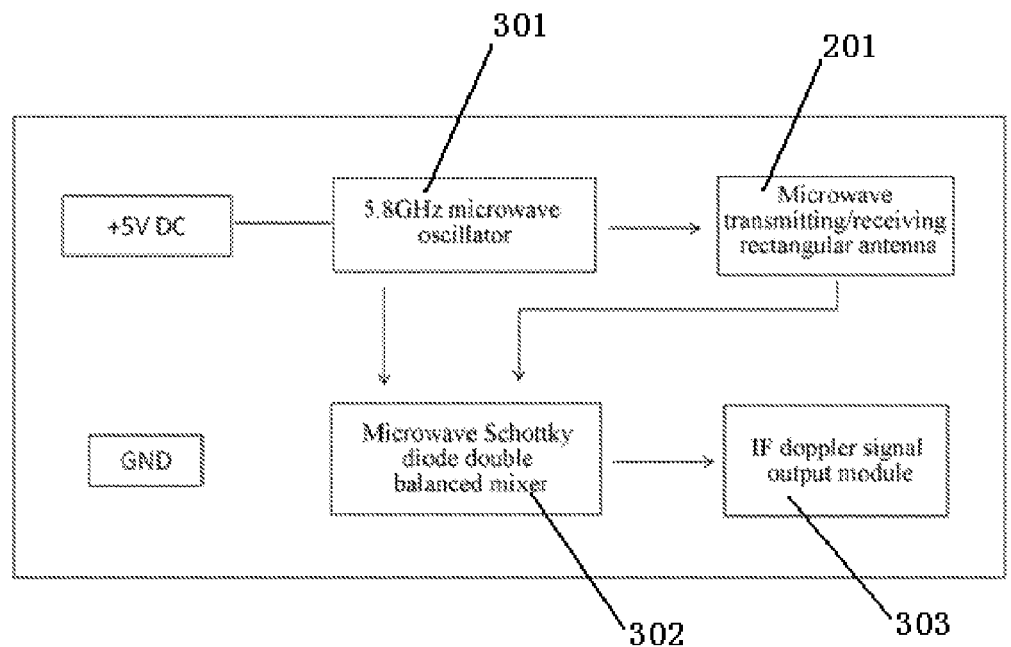
FIG. 5 is a schematic diagram of a connection structure according to an embodiment of the present invention.
Figure 6:
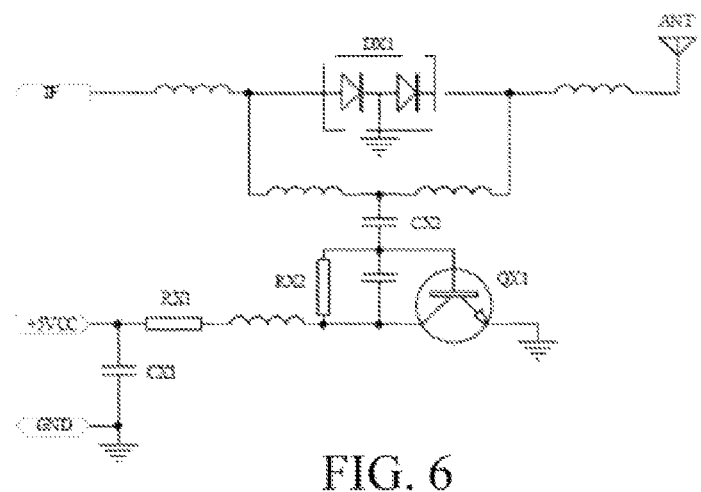
FIG. 6 is a schematic diagram of a circuit structure according to an embodiment of the present invention.
Figure 7:
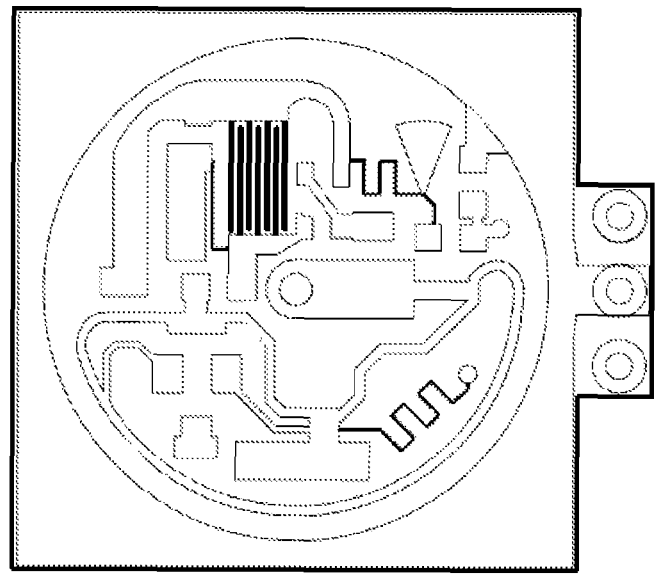
FIG. 7 is a structural diagram of an upper surface of an oscillation circuit board according to an embodiment of the present invention.
Figure 8:
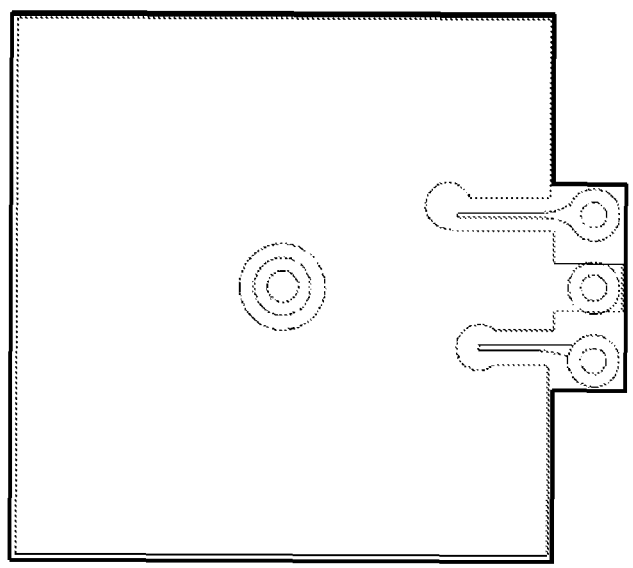
FIG. 8 is a structural diagram of a bottom surface of an oscillation circuit board according to an embodiment of the present invention.

As shown in FIG. 5, the oscillation circuit board includes a board body of the oscillation circuit board, a microwave oscillator 301, a mixer circuit (a microwave Schottky diode double balanced mixer) 302, and a signal output module (an IF doppler signal output module) 303. The board body of the oscillation circuit board includes an upper surface and a bottom surface. The microwave oscillator 301, the microwave Schottky diode double balanced mixer 302 and the IF doppler signal output module 303 are all disposed on the upper surface of the board body of the oscillation circuit board. The microwave oscillator 301 includes an input end and an output end. The input end of the microwave oscillator 301 is connected to a power supply, and the output end of the microwave oscillator 301 is connected to an input end of the microwave Schottky diode double balanced mixer 302 and the antenna board 104. The input end of the microwave Schottky diode double balanced mixer 302 is also connected to the planar antenna, and an output end of the microwave Schottky diode double balanced mixer 302 is connected to an input end of the IF doppler signal output module 303.

The board body of the oscillation circuit board is a double-sided PCB. A model of the board body of the oscillation circuit board is RO4003C high frequency board. The oscillation circuit board has a cuboidal board body. The board body of the oscillation circuit board has a length of 21.5 mm, a width of 19 mm, a substrate thickness of 0.3 mm and a dielectric constant of 3.38. The board body of the oscillation circuit board may also be designed by using an FR-4 material. An FR-4 board with a thickness of 0.5-0.7 mm and a dielectric constant of 4.3-4.8 is selected for design. The assembly portion of the board body of the oscillation circuit board is provided with pin header through holes, and the number of the pin header through holes is 3.

The microwave oscillator is a Colpitts oscillator. The microwave oscillator includes a high frequency transistor, a microstrip inductor and a microstrip capacitor. The inductance of copper foil of the microstrip inductor is 1.6-1.9 nH, and the capacitance of copper foil of the microstrip capacitor is 0.25-0.29 pF. The microwave oscillator can generate an oscillation signal having a C-band frequency of 5.8 GHz.

The microwave Schottky diode double balanced mixer has ring impedance, and a value of the ring impedance is 50Ω.

The antenna board includes a board body of the antenna board and a microwave transmitting/receiving antenna. The microwave transmitting/receiving antenna is disposed on the board body of the antenna board. The board body of the antenna board is a double-sided PCB. A model of the board body of the antenna board is RO4003C high frequency board. The antenna board has a cuboidal board body. The board body of the antenna board has a length of 19 mm, a width of 13.5 mm and a substrate thickness of 0.8-0.9 mm, and a dielectric constant of the board body of the antenna board is 3.38. The antenna board is of an independent and separate structure, and the antenna board is fixedly disposed on the bottom surface of the oscillation circuit board by means of an SMD or metal wire soldering.

The microwave transmitting/receiving antenna is of a planar rectangular structure. The microwave transmitting/receiving antenna is designed as a rectangular antenna by using PCB copper foil, and the PCB copper foil of the rectangular antenna has a length of 18.25 mm and a width of 12.8 mm. The microwave transmitting/receiving antenna has both functions of transmitting microwaves and receiving microwaves. The microwave oscillator generates an oscillation signal having a frequency of 5.8 GHZ, and the oscillation signal is output to the microwave transmitting/receiving rectangular antenna; the microwave transmitting/receiving rectangular antenna transmits a microwave signal having a frequency of 5.8 GHZ, and when a moving human body or object is detected, the microwave transmitting/receiving rectangular antenna receives an echo signal having a reflection frequency.

The pin header component includes a +5 VDC power input pin header, a GND reference pin header and a signal output pin header. The three pin headers fit with the pin header through holes of the assembly portion of the board body of the oscillation circuit board.

Figure 9:
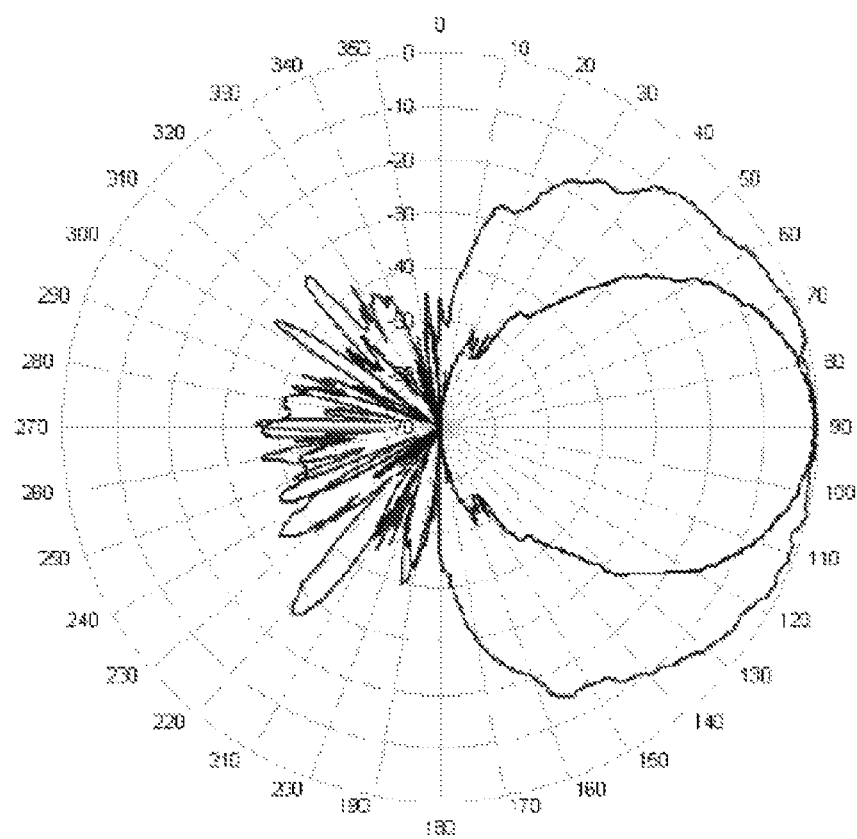
FIG. 9 is a diagram of electromagnetic wave field strength according to an embodiment of the present invention.

The 5.8 GHz planar antenna type microwave sensor in the present invention operates according to the following principle:

The power supply supplies power to the microwave oscillator of the oscillation circuit board through the power input pin header. The microwave oscillator generates an oscillation signal having a frequency of 5.8 GHZ, the oscillation signal is output to the microwave transmitting/receiving antenna of the antenna board, and the microwave transmitting/receiving antenna transmits a microwave signal having a frequency of 5.8 GHZ. As shown in FIG. 9, FIG. 9 is a diagram of electromagnetic wave field strength of the planar antenna type microwave sensor in the present invention. When a moving human body or object is detected, the microwave transmitting/receiving antenna may receive an echo signal having a reflection frequency. After the oscillation signal generated by the microwave oscillator and the echo signal are output to the microwave Schottky diode double balanced mixer for differential-frequency processing, an IF doppler signal is output, and after the IF doppler signal is processed by a frequency selective amplifier, a valid control signal is obtained through analog-to-digital conversion.

The foregoing descriptions of the planar antenna microwave module of the present invention are used to help understand the present invention, but implementation manners of the present invention are not limited to the foregoing embodiments. Any variation, modification, replacement, combination, or simplification made without departing from the principle of the present invention is regarded as an equivalent replacement manner, and shall fall within the protection scope of the present invention.

What is claimed is:

1. A planar antenna microwave module, comprising: an oscillation circuit board and a planar antenna board, wherein the oscillation circuit board is a double-sided printed circuit board (PCB) of which an upper surface is laid with a 5.8 GHZ microwave oscillator, a microwave Schottky diode double balanced mixer and an intermediate frequency (IF) doppler signal output module; the planar antenna board is a double-sided PCB independent of the oscillation circuit board; PCB copper foil of the planar antenna board forms a transmitting/receiving planar antenna; and the planar antenna is laminated on a bottom surface of the oscillation circuit board by using a solder joint that runs through and electrically connects two layers of PCB copper foil, and is electrically connected to the oscillation circuit board through the solder joint;

wherein the microwave oscillator comprises an input end and an output end, the input end of the microwave oscillator is connected to a power supply, the output end of the microwave oscillator is connected to an input end of the microwave Schottky diode double balanced mixer and the antenna board, the input end of the microwave Schottky diode double balanced mixer is also connected to the planar antenna, and an output end of the microwave Schottky diode double balanced mixer is connected to an input end of the IF doppler signal output module.

2. The planar antenna microwave module according to claim 1, wherein one side of the oscillation circuit board is provided with an assembly portion, a pin header component is jointed with the assembly portion of the oscillation circuit board, and a metal shielding can covers an upper surface of the oscillation circuit board.

3. The planar antenna microwave module according to claim 1, wherein the oscillation circuit board has a cuboidal board body, the board body of the oscillation circuit board has a length of 21.5 mm, a width of 19 mm, a thickness of 0.3 mm, and a dielectric constant of 3.38; or the board body of the oscillation circuit board is an FR-4 board with a thickness of 0.5-0.7 mm and a dielectric constant of 4.3-4.8.

4. The planar antenna microwave module according to claim 1, wherein the microwave oscillator comprises a high frequency transistor, a microstrip inductor and a microstrip capacitor, the inductance of copper foil of the microstrip inductor is 1.6-1.9 nH, and the capacitance of copper foil of the microstrip capacitor is 0.25-0.29 pF.

5. The planar antenna microwave module according to claim 1, wherein the microwave Schottky diode double balanced mixer has ring impedance, and a value of the ring impedance of the microwave Schottky diode double balanced mixer is 50Ω.

6. The planar antenna microwave module according to claim 1, wherein the planar antenna board has a cuboidal board body, the board body of the planar antenna board has a length of 19 mm, a width of 13.5 mm and a thickness of 0.8-0.9 mm, and a dielectric constant of the board body of the planar antenna board is 3.38.

7. The planar antenna microwave module according to claim 1, wherein the transmitting/receiving planar antenna is of a planar rectangular structure, the transmitting/receiving planar antenna is designed as a rectangular antenna by using PCB copper foil, and the PCB copper foil of the rectangular antenna has a length of 18.25 mm and a width of 12.8 mm.

8. The planar antenna microwave module according to claim 1, wherein the planar antenna board is of an independent and separate structure, the planar antenna board is fixedly disposed on the bottom surface of the oscillation circuit board by means of a surface-mount device (SMD) or metal wire soldering.

* * * * *